United States Patent Office.

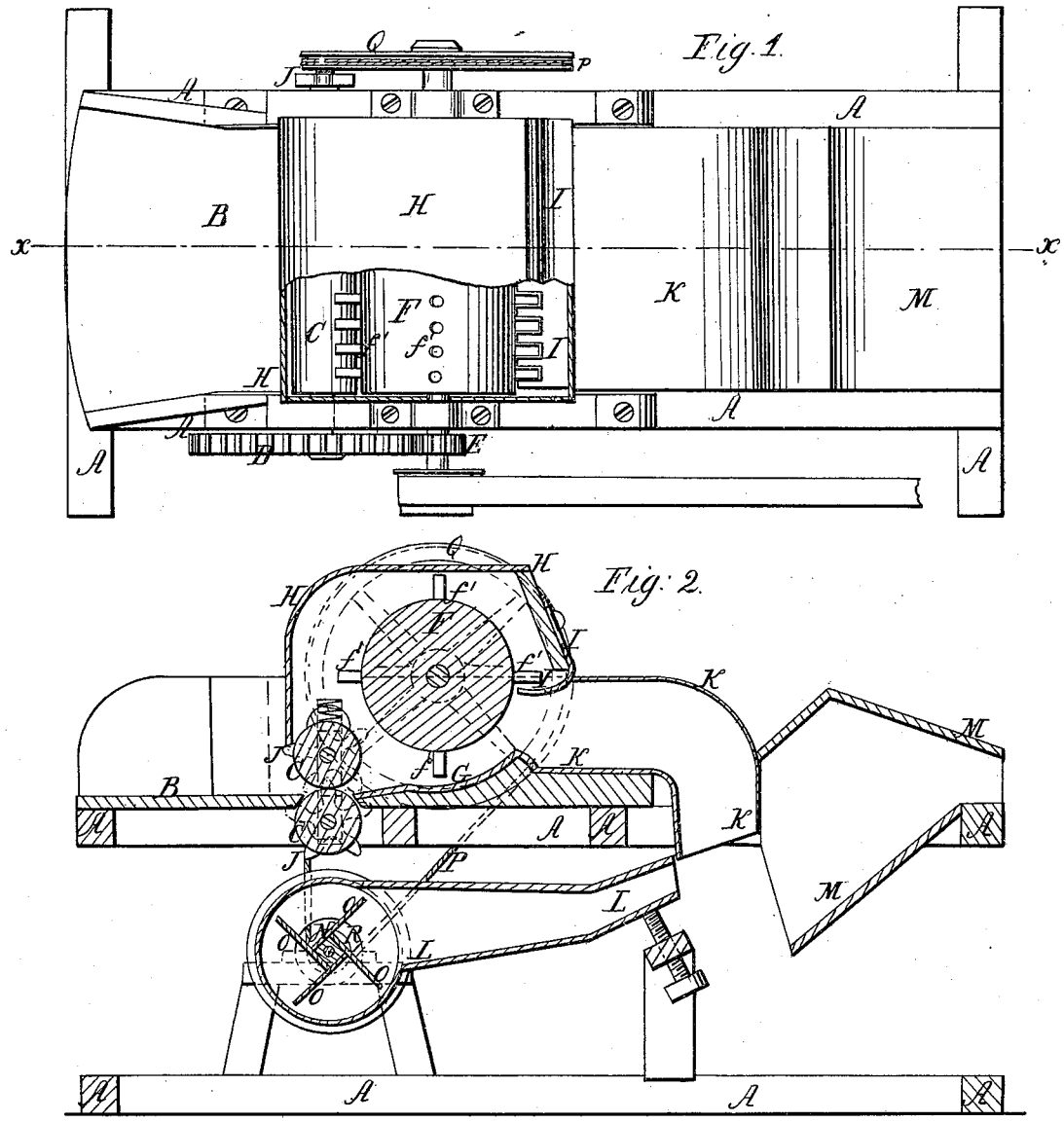

MYRON MOSES, OF MALONE, NEW YORK.

Letters Patent No. 101,494, dated April 5, 1870; antedated April 1, 1870.

IMPROVEMENT IN HOP-PICKER.

The Schedule referred to in these Letters Patent and making part of the same.

*To all whom it may concern:*

Be it known that I, MYRON MOSES, of Malone, in the county of Franklin and State of New York, have invented a new and useful Improvement in Hop-Pickers; and I do hereby declare that the following is a full, clear, and exact description thereof, which will enable others skilled in the art to make and use the same, reference being had to the accompanying drawings forming part of this specification, in which—

Figure 1 is a top view of my improved machine, part being broken away to show the construction.

Figure 2 is a vertical longitudinal section of the same, taken through the line $x\,x$, fig. 1.

Similar letters of reference indicate like parts.

My invention has for its object to furnish an improved machine for picking hops from the vines, separating them from the vines and leaves, and cleaning them, which shall be simple in construction and effective in operation, doing its work quickly and well.

It consists in the construction and combination of various parts of the machine, as hereinafter more fully described.

A is the frame of the machine.

B is the feed-apron.

C are the feed-rollers, which may be made of rubber or other suitable material, the lower one of which revolves in stationary bearings attached to the frame A.

The bearings of the upper feed-roller C are placed in a vertical slot in supports attached to the frame A, so that the said upper feed-roller may give, to accommodate itself to the varying thickness of the vines passing between said feed-rollers.

The bearings of the upper feed-roller C are held down by coiled or equivalent springs, so that they may hold the vines with the necessary strength, while, at the same time, they give, to adjust the roller C to the varying thickness of the vines passing through the machine.

To the ends of the journals of the feed-rollers C, upon one side of the machine, are attached finger-gear wheels J, the teeth of which mesh into each other, so that the one roller may be driven by the other.

To one of the journals of the lower feed-roller C is attached a large gear-wheel, D, the teeth of which mesh into the teeth of the small gear-wheel E, attached to the journal of the picker-cylinder F, so that the said feed-rollers may receive motion from the said picker-cylinder F, and so that the said feed-rollers may move at a less velocity than the said picker-cylinder, and thus hold the vines against the action of the teeth of the picker-cylinder F.

The cylinder F is furnished with four, more or less, rows of teeth or pickers, $f'$, by the action of which the clusters of hops, vines, and leaves are torn in pieces, and pass beneath the cylinder F, along the concave G.

The concave G is made of iron or other suitable metal, and upon such a curve that there may be a little space between the ends of the teeth $f'$ and the surface of the concave G, where the hops pass in, said space becoming less and less until where the hops pass out the teeth $f'$ may just clear the surface of the said concave.

The concave G is removably secured in place, so that, as it becomes worn, it may be conveniently removed and replaced with a new one.

The cylinder F and the upper part of the upper feed-roller C are covered and incased with a removable cap, H, to prevent the hops from being scattered by the rapid revolution of the cylinder F.

I is a plate, attached to the side of the cap H, or to some other suitable support.

The lower edge of the plate I projects inward to or nearly to the surface of the cylinder F, and is slotted, to allow the teeth or pickers $f'$ of said cylinder F to pass through, as shown in figs. 1 and 2, the slotted plate or comb I thus cleaning off the teeth of the cylinder, and thus preventing any of the hops or vines from being carried back by said teeth.

K is a spout, leading forward from the cylinder F, and the forward part of which is curved downward, so as to allow the hops, vines, and leaves to drop through the lower part of the machine, where, while falling, they are exposed to the blast of air issuing from the spout L of the fan-blower.

The blast of the fan-blower must be sufficiently strong to separate the hops from the vines and leaves, so that, while the vines and leaves drop upon the ground or into a receptacle prepared to receive them, the hops may be driven into and through the spout M, by which they are conducted into the desired receptacle.

As the hops are very light, the mouth of the spout M should be made somewhat hopper-shaped, and the spout should be so adjusted in place upon the frame A that its mouth may be in a direct line with the spout L of the fan-blower.

The shaft N, to which the fans O are attached, is driven from the picker-cylinder F by the band P, which passes around the pulley Q, attached to the end of one of the journals of said cylinder F, and around the pulley R, attached to the end of the journal of the fan-shaft N, as shown in dotted lines in fig. 2.

Having thus described my invention,

I claim as new and desire to secure by Letters Patent—

1. In combination with a self-graduating feed device, the revolving fingered cylinder F, the former revolving at a slow, while the latter revolves at an accelerated velocity, and the former thus holding, while the latter strips the hops from the vines, in the manner described.

2. The slotted or comb-plate I, in combination with the picker-cylinder F, substantially as herein shown and described, and for the purpose set forth.

3. The spout M, constructed substantially as described, in combination with the spouts K and L, to receive and collect the hops driven off by the blast, substantially as herein shown and described.

4. The combination of the feed-rollers C, picker-cylinder F, cap H, comb or cleaner-plate I, spout K, fan-blower N O, blast-spout L, and spout M, with each other, said parts being constructed and arranged substantially as herein shown and described, and for the purpose set forth.

The above specification of my invention signed by me this 15th day of June, 1868.

MYRON MOSES.

Witnesses:
FRANK BLOCKLEY,
ALEX. F. ROBERTS.